United States Patent [19]
Frank

[11] 3,731,747
[45] May 8, 1973

[54] DISK HARROW

[75] Inventor: William Rudolph Frank, Moline, Ill.

[73] Assignee: Deere & Company, Moline, Ill.

[22] Filed: Nov. 1, 1971

[21] Appl. No.: 194,640

[52] U.S. Cl.................................172/311, 172/456
[51] Int. Cl..............................................A01b 49/00
[58] Field of Search....................172/311, 456, 662, 172/568; 280/411 R, 411 A; 16/163, 164

[56] References Cited

UNITED STATES PATENTS

| | | | |
|---|---|---|---|
| 3,669,195 | 6/1972 | Green et al. | 172/311 |
| 3,321,028 | 5/1967 | Groenice | 172/311 |
| 3,193,023 | 7/1965 | Adee | 172/311 |
| 3,545,033 | 12/1970 | Couser | 16/163 |
| 2,954,578 | 10/1960 | Nyquist | 16/164 |
| 3,118,507 | 1/1964 | Oehler et al. | 172/662 |

Primary Examiner—Robert E. Pulfrey
Assistant Examiner—R. T. Rader
Attorney—H. Vincent Harsha et al.

[57] ABSTRACT

An implement frame comprising a pair of subframes normally disposed in a side-by-side operating position and having a plurality of concave soil-working disks supported thereon operative as the implement is advanced forwardly to exert a lateral reaction force on the subframes. A pivot mechanism connects the subframes for pivotal movement about a longitudinally extending axis to permit the implement to conform to the contour of the ground during operation and to permit one of the subframes to be swung to a position above the other, thereby substantially reducing the width of the implement for transport. The mechanism connecting the subframes is constructed in such a manner that the pivot axis moves upwardly as the subframes are moved from their operating to their transport position, the axis being at a relatively low point during operation to resist the tendency of the soil reaction force acting on the disks to raise the center of the implement, and at a relatively high point during conversion of the implement from its operating to its transport position to permit the subframes to assume the latter position.

11 Claims, 11 Drawing Figures

INVENTOR.
W. R. FRANK

BY
John O. Hayes
ATTORNEY

Patented May 8, 1973
3,731,747
5 Sheets-Sheet 2
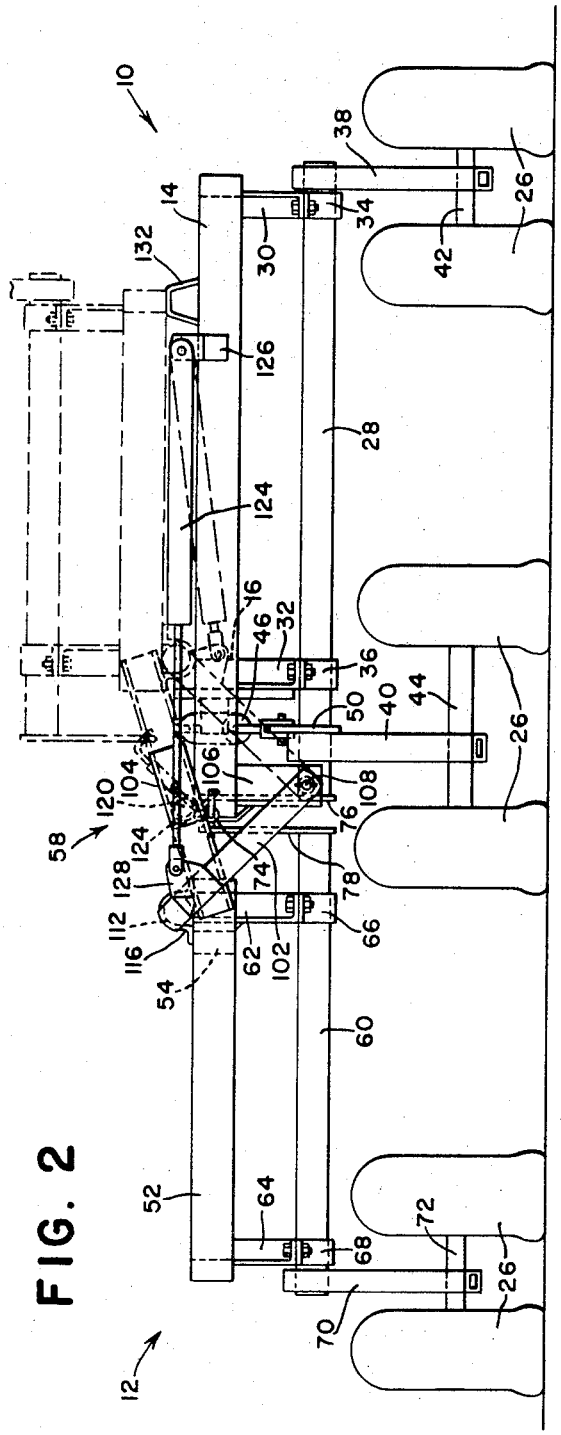
FIG. 2
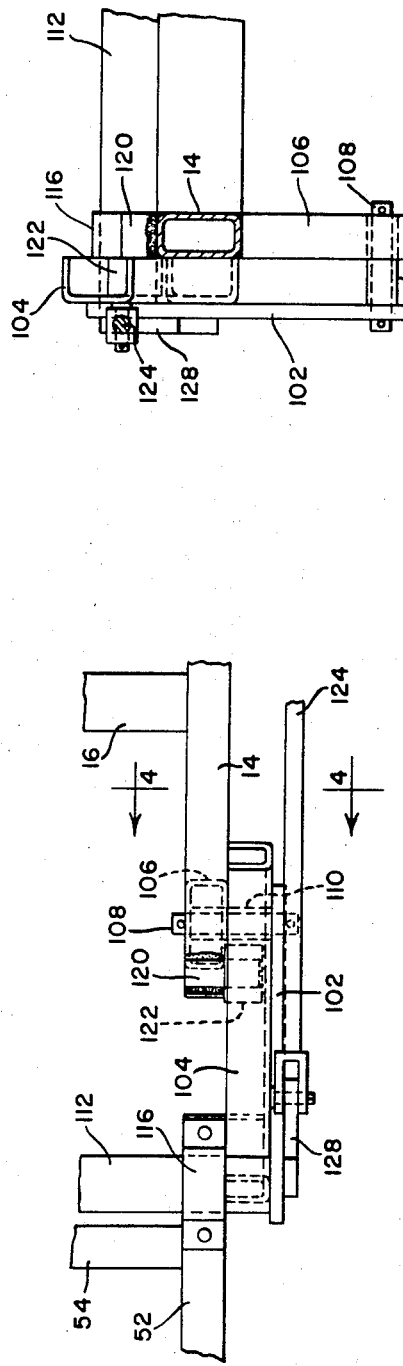
FIG. 3
FIG. 4
INVENTOR.
W. R. FRANK
BY
John O. Hayes
ATTORNEY Patented May 8, 1973
3,731,747
5 Sheets-Sheet 3
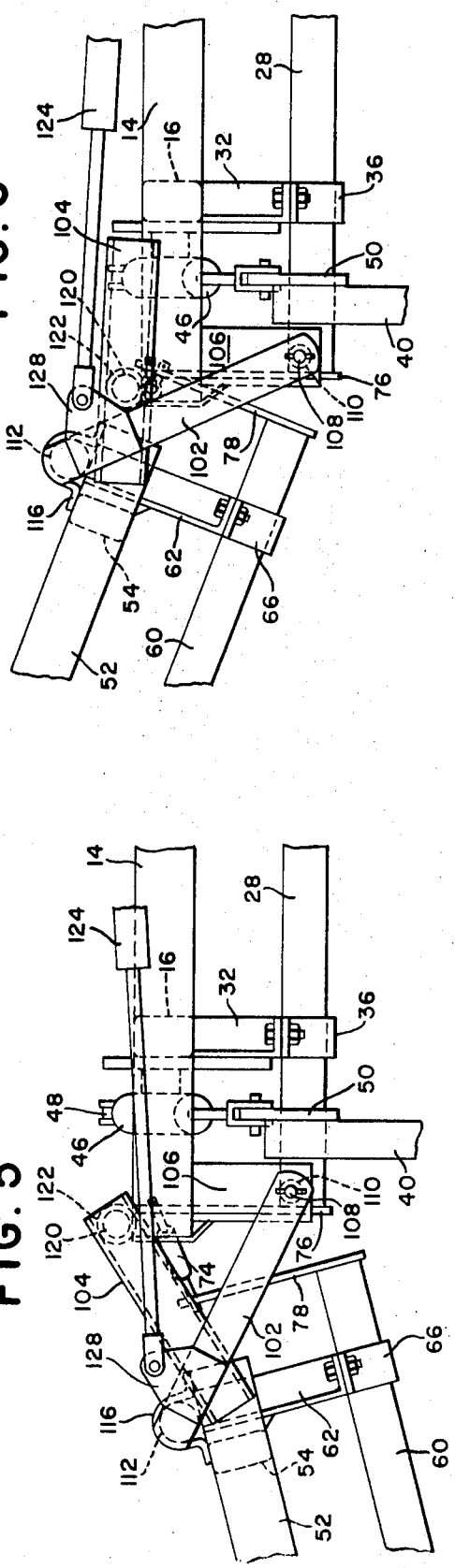
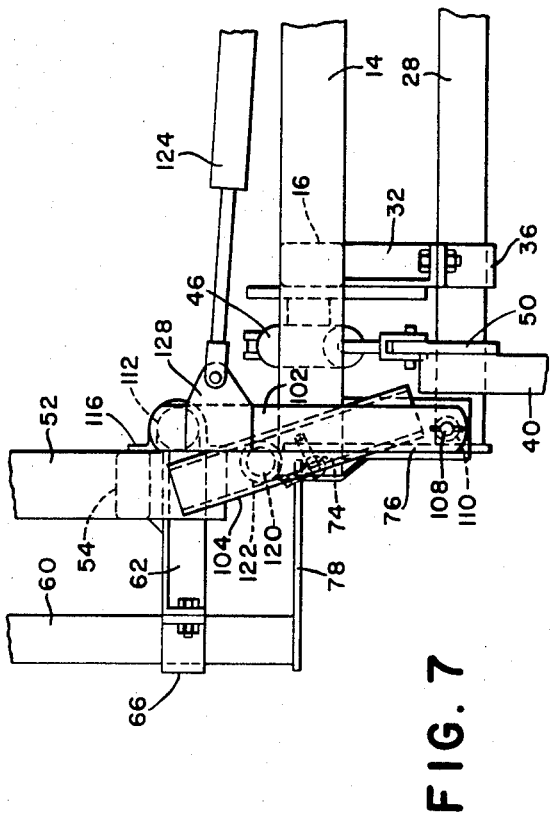
INVENTOR.
W. R. FRANK
BY
John O. Hayes
ATTORNEY Patented May 8, 1973

INVENTOR
W. R. FRANK

BY

John O. Hayes
ATTORNEY

Patented May 8, 1973

INVENTOR.
W. R. FRANK

BY John O. Hayes
ATTORNEY 3,731,747

DISK HARROW

BACKGROUND OF THE INVENTION

The present invention relates generally to ground-working agricultural implements and more particularly to an implement comprising a pair of subframes relatively pivotal about a longitudinal axis between an extended operating position and a folded transport position.

Although the maximum working width of ground-working agricultural implements is limited only by the ability of available tractors to pull them through the ground, the maximum transport width thereof is dictated by the existing width of roadways and gateways, as well as by legal and safety considerations. It is thus conventional to include in the design of certain implements provision whereby the implement can be converted from a wide operating position to a substantially narrower width for transport purposes. In disk harrow design, for example, it is conventional to pivotally mount the outer end portions of the disk gangs to fold over the inner portions thereof to reduce the width of the implement. Such an arrangement is disclosed in U.S. Pat. No. 3,118,507 to Oehler et al., issued Jan. 21, 1964. A modification of the foregoing, shown in U. S. Pat. No. 3,193,023 to Adee, issued July 6, 1965, consists of pivotally mounting the entire side portions of the harrow frame for folding to a transport position. Yet a further modification consists of pivotally connecting a right and left pair of subframes for movement about a longitudinal axis between an extended operating position wherein the subframes are disposed in side-by-side relation and a folded transport position wherein one subframe is inverted relative to its operating position and disposed above the other subframe.

It is desirable, in the case of the last-mentioned modification, to permit the subframes to pivot freely relative to each other in the operating position, to allow the implement to conform to the contour of the ground being worked. However, a serious problem is encountered in the use of such an implement frame having a plurality of concave soil-working disks mounted thereon, since the lateral reaction force imposed by the soil on the disks causes the subframes to buckle upwardly about their pivotal connection. This problem, in turn, results from the fact that the axis of the pivotal connection, in order to permit the subframes to assume their folded transport position, must be located at a point substantially higher than the line of the reaction force, thereby creating a moment arm through which the force acts equal in length to the distance between the pivot point and the line of force. Although a lateral reaction force from the opposite direction is exerted by the rear disks included on conventional offset and tandem disk harrows, this force is generally less than that acting on the front disks since the rear disks operate in relatively loose ground. In addition, torsion bending of the frame absorbs part of the reaction force exerted on the rear disks and prevents its full transmission to the forward portion of the implement.

SUMMARY OF THE INVENTION

It is, accordingly, the primary object of the present invention to provide an improved implement frame for a disk harrow or the like consisting of a pair of subframes relatively pivotal about a longitudinal axis between an extended operating position and a folded transport position. More specifically, it is an object of the invention to provide such an implement frame wherein the axis of the pivotal connection between the subframes is sufficiently low in the operating position to resist lateral reaction forces tending to buckle the subframes upwardly about their pivotal connection, and is movable upwardly to permit the subframes to assume their transport position. It is a further object to provide such an implement frame having means for moving the pivot axis of the subframes from a low position to a high position in response to movement of the subframes from their operating to their transport position. It is yet a further object to provide means for moving the subframes between their operating and transport positions, which means includes mechanical means for permitting the subframes to pivot freely relative to each other when in the former position.

In pursuance of these and other objects the invention comprises, generally, an implement frame consisting of a pair of subframes normally disposed in a side-by-side operating position and having a plurality of concave, ground-engaging disks mounted thereon. In one embodiment of the invention the subframes are connected for relative movement about a longitudinal axis by a pivot mechanism comprising a link member interconnecting a pair of pivot means on the respective subframes, and a rigid structure on one of the subframes slidably and pivotally received by the other subframe, while in another embodiment the mechanism pivotally connecting the subframes comprises a pair of crossed link members. Each of these mechanisms is so constructed and arranged that the effective pivot axis thereof is at a relatively low position when the subframes are in their operating position, but rises to a higher position as the subframes are folded to their transport position. The low position of the axis reduces the length of the moment arm through which the soil reaction force acts and thereby resists the tendency of the subframes to buckle upwardly about their pivotal connection, while the high position permits the subframes to assume their transport position. In one of the embodiments, a lift arm mechanism is provided which permits the subframes to pivot freely relative to each other in the operating position, but which is automatically locked in engagement with one of the subframes when the implement is converted to its transport position.

BRIEF DESCRIPTION OF THE DRAWINGS

The preferred embodiments of the present invention will be described in conjunction with the accompanying drawings in which:

FIG. 2 is an enlarged rear elevation view of the implement shown in FIG. 1, with the disk gangs removed therefrom for the sake of clarity and illustrating the transport position of the left subframe in phantom;

FIG. 3 is an enlarged plan view of the pivot mechanism of the implement shown in FIG. 1;

FIG. 4 is a view of the pivot mechanism taken along the line 4—4 of FIG. 3;

FIG. 5 is an enlarged rear elevation view of the pivot mechanism showing the left subframe inclined downwardly from its normal operating position;

Figure 1:
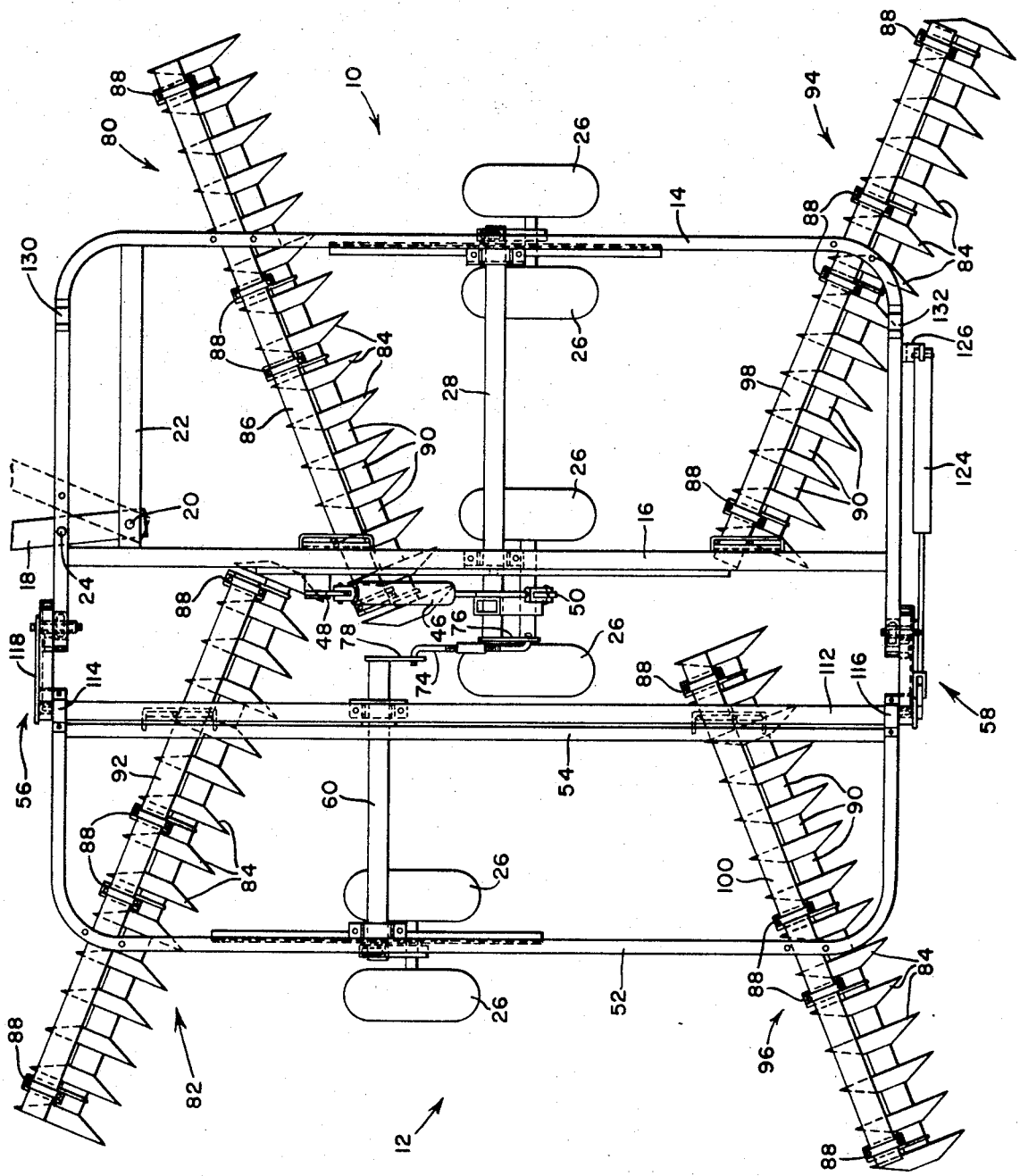
FIG. 1 is a plan view of an implement constructed in accordance with one embodiment of the invention.

ries of disks 84 and spacers 90 rotatably supported on the lower ends of the standards 88. The left rear gang 96 is similarly constructed and comprises a gang frame member 100 adjustably mounted on the frame members 52 and 54, a plurality of spaced standards 88 secured to and extending downwardly from the member 100, and a series of disks 84 and spacers 90 rotatably supported on the lower ends of the standards 88.

Reference is now made to FIGS. 2–7 of the drawings which illustrate the rear pivot mechanism 58 in detail. Since the front pivot mechanism 56 is substantially a mirror image of the rear mechanism 58, the ensuing description will be analogously applicable to the mechanism 56 and a detailed description of the latter thus need not be given. The basic elements of the rear mechanism 58 consist of a link member 102 interconnecting longitudinal pivots on the subframes 10 and 12, an elongated channel structure 104 fixed to the left subframe 12, and a pivot member on the right subframe 10 slidably and pivotally supporting the structure 104.

The longitudinal pivot receiving the lower end of the link 102 is located on the lower end of a vertical support 106 fixed to and extending downwardly from the frame member 14, and is defined by a longitudinal, cylindrical pin 108 received by the support 106, and in turn receiving the lower end of the link 102. A spacer member 110 maintains the link 102 at a fixed distance from the support 106. As shown best in FIG. 1, the longitudinal pivot mounting the upper end of the link 102 on the left subframe 12 comprises a longitudinal tube 112 extending the entire length of the subframe 12 and rotatably mounted thereon by means of U-shaped bearing members 114 and 116 on the fore-and-aft legs of the frame member 52. The upper end of the link 102 is rigidly fixed to the extreme rear end of the tube 112 and an identical, parallel link 118, forming a part of the forward pivot mechanism 56, is rigidly fixed to the extreme forward end of the tube 112. As will become apparent hereinafter, the purpose of the tube 112 is to maintain the fore-and-aft ends of the left subframe 12 at substantially the same height relative to the right subframe 10 during conversion of the implement between its operating and transport positions.

The structure 104 comprises a forwardly opening channel member of generally U-shaped cross-sectional configuration rigidly fixed to the inner end of the frame member 52. A guide assembly on the subframe 12, comprising a longitudinal shaft 120 fixed to the upper surface of the frame member 14 and having a wheel or roller 122 rotatably mounted thereon, is received between the legs of the outer end portion of the channel structure 104 and is operative to invert the subframe 12 as it is swung to its transport position. It will be apparent from the structure described thus far that the channel member 104 is both slidably and pivotally received by the roller 122.

The implement is moved between its operating and transport positions by means of a transversely extending, extensible and retractable hydraulic ram 124 mounted on the rear portion of the implement and acting between a bracket 126 on the frame member 14 and a bracket 128 on the link 102. Not shown in the drawings are the conventional hydraulic hoses for connecting the ram 124 with a source of pressurized fluid on the tractor. During normal operation of the implement, the ram 124, through the use of a special hydraulic "float" valve, is permitted to freely extend and retract, and the subframes 10 and 12 are thus free to pivot relative to each other to conform to lateral variations in the ground level. FIG. 5 illustrates the implement in its operating position with the left subframe 12 inclined downwardly with respect to the right subframe 10, while FIG. 6 shows the subframe 12 inclined upwardly relative to the subframe 10. It will be apparent from these figures, which illustrate the approximate range of relative movement of the subframes during normal operation, that the location of the pivot axis of the connecting mechanism 58 during such operation approximates that of the pin 108. As the ram 124 is retracted to raise the left subframe 12 to its transport position, however, as shown in FIG. 7, the construction and arrangement of the connecting mechanism 58 causes the location of the pivot axis thereof to move upwardly to the general area of the roller 122. Thus, while the location of the pivot axis in the operating position is sufficiently low to effectively resist the tendency of the soil reaction force acting on the front disk gangs 80 and 82 to buckle the subframes upwardly about their pivotal connection, the location thereof moves upwardly as the left subframe 12 is raised by the ram 124, to permit the subframe 12 to assume its folded transport position shown in phantom in FIG. 2.

In the transport position of FIG. 2, the fore-and-aft legs of the frame member 52 of the subframe 12 rest on inverted U-shaped supports 130 and 132 on the fore-and-aft legs of the frame member 14. As noted previously, the hitch member 18 on the forward portion of the right subframe 10 is swingable to a transport position, shown in phantom in FIG. 1, wherein the clevis on the forward end thereof lies substantially on the longitudinal centerline of the implement when in its folded transport position. To convert the implement from its transport to its operating position, the ram 124 is extended, causing the subframe 12 to swing down to the position shown in solid lines in FIG. 2, and the hitch member 18 is swung to the left and secured by the pin 24.

Figure 8:
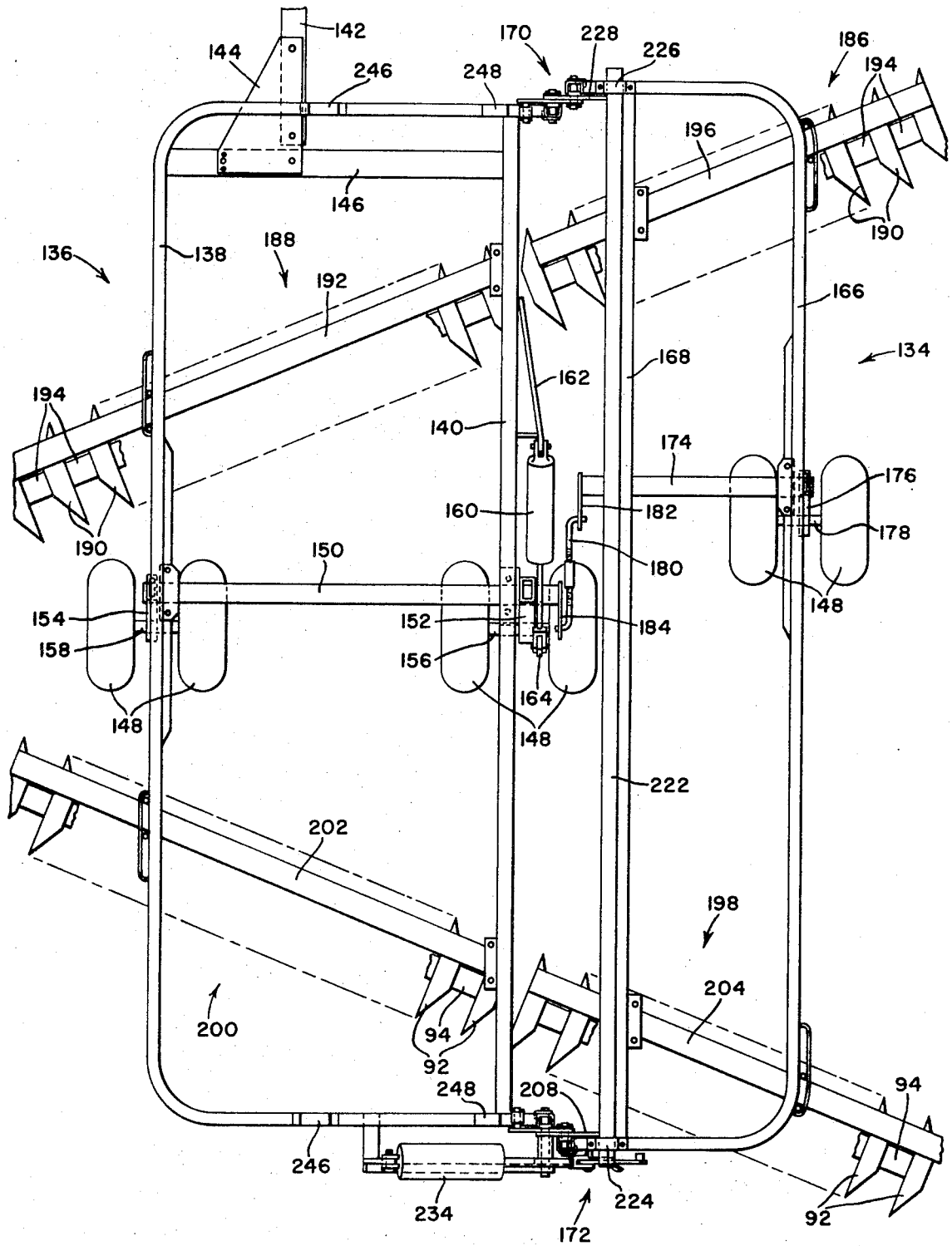

A second embodiment of the invention is illustrated in FIGS. 8–11 of the drawings and comprises a pair of subframes 134 and 136 swingable between an extended operating position as shown in FIG. 8 and a folded transport position wherein the right subframe 134 is inverted relative to its operating position and disposed above the left subframe 136. The construction of this embodiment is basically similar to that of the embodiment already described, with the exception of the disk gang configuration and the mechanism pivotally connecting the front and rear portions of the subframes. The left subframe 136 includes a longitudinally extending, generally U-shaped frame 138, the fore and aft transverse legs of which are interconnected by a longitudinal member 140. A hitch member 142, shown only partially in FIG. 8, is supported on a triangular plate 144 fixed to a transverse frame member 146 extending between the members 138 and 140, and has a conventional clevis mounted on its forward end for receiving the drawbar of a tractor. The clevis is positioned to the left of the longitudinal centerline of the implement when in its operating position due to the offset disk gang configuration which causes the harrow to trail to the right of the towing tractor. No adjustment of the hitch member 142 need ordinarily be made to convert the implement to its transport configuration, since the clevis in the latter position of the implement will lie substantially on the longitudinal centerline thereof.

The subframe 136 is supported relative to the ground by a right and left pair of ground-engaging wheels 148, the wheels, in turn, being supported on a transverse rockshaft 150 for vertical adjustment relative to the subframe. The rockshaft 150 is rockably supported on the frame members 138 and 140 in a manner similar to that in which the rockshaft 28 of the embodiment illustrated in FIG. 2 is supported on the subframe 10. Fixed to and extending downwardly from the opposite ends of the rockshaft are parallel support arms 152 and 154 which, in turn, have transverse axles 156 and 158 fixed to their outer ends. A pair of wheels 148 are rotatably carried by each of the axles 156 and 158. A hydraulic ram 160 acting between a support 162 fixed to the frame member 140 and an arm 164 extending radially from the rockshaft 150, is extensible and retractable to rotate the latter and thereby raise and lower the wheels 148 relative to the subframe 136. The hydraulic ram 160 is connectible in a conventional manner with a source of pressurized fluid on the tractor used to tow the implement.

The right subframe 134 is similar in construction to the left subframe 136 and comprises a longitudinally extending, generally U-shaped frame member 166, the fore and aft legs of which are interconnected by a longitudinal member 168. As will be hereinafter described, the front and rear adjacent inner end portions of the subframes 134 and 136 are interconnected by means of front and rear pivot mechanisms indicated generally by the numerals 170 and 172, respectively, the pivot mechanisms serving to support the left side of the subframe 134 on the right side of the subframe 136. The right side of the subframe 134 is supported relative to the ground by a pair of wheels 148, which, in turn, are supported on a transverse rockshaft 174 for vertical adjustment relative to the subframe. The rockshaft 174 is rockably supported on the frame members 166 and 168 in the manner previously described with respect to the rockshaft 60 on the subframe 12. A wheel support arm 176, having a transverse axle 178 fixed to its lower end and supporting the wheels 148, is connected to and extends downwardly and rearwardly from the right outer end of the rockshaft 174. An adjustable link member 180 interconnects radial arms 182 and 184 on the inner adjacent ends of the rockshafts 174 and 150 to rotate the former in response to rotation of the latter and thereby maintain the subframes 134 and 136 at a uniform elevation relative to the ground.

A pair of substantially aligned, diagonally extending disk gangs 186 and 188 are mounted on the forward portions of the subframes 134 and 136, respectively. When lowered into engagement with the ground, the concave soil-working disks 190 comprising the gangs 186 and 188 are thus operative, as the implement is advanced forwardly, to deflect soil toward the right side of the implement. The left gang 188 comprises a gang frame member 192 mounted in a conventional, adjustable manner on the underneath sides of the frame members 138 and 140, and a series of aligned disks 190 and spacers 194 rotatably supported beneath the frame member 192 in a manner described previously with reference to the disk gangs 80, 82, 94 and 96 of the first embodiment of the invention. The right disk gang 186 is constructed in a manner similar to the left gang 188 and comprises a gang frame member 196 adjustably mounted on the frame members 166 and 168, and a series of aligned disks 190 and spacers 194 rotatably supported thereon.

Mounted on the rear portions of the subframes 134 and 136 are a pair of aligned, diagonally extending disk gangs 198 and 200, respectively. As the implement is advanced forwardly, the concave disks 190 comprising the gangs 198 and 200 are operative to engage and deflect soil toward the left side of the implement. The left rear disk gang 200 comprises a gang frame member 202 adjustably mounted on the frame members 138 and 140, and a series of disks 190 and spacers 194 rotatably supported thereon. Similarly, the right rear gang 198 comprises a gang frame member 204 mounted on the frame members 166 and 168, and a series of disks 190 and spacers 194 rotatably supported thereon.

Figure 9:
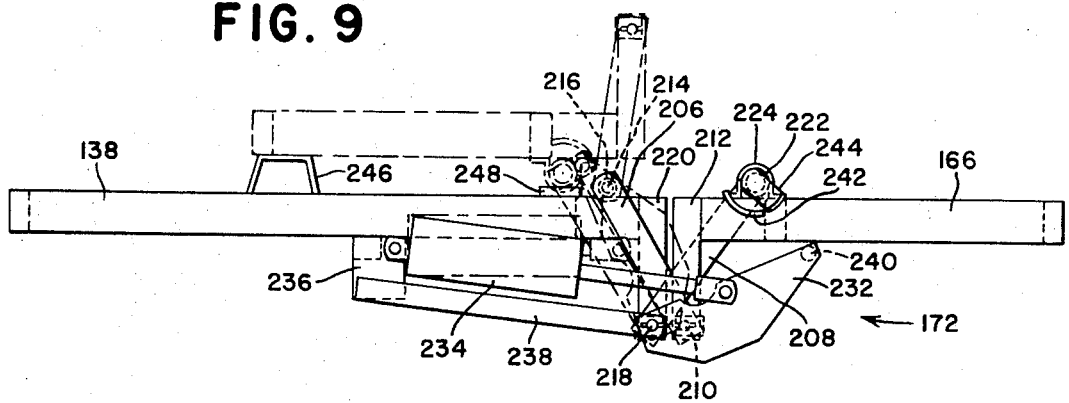
Figure 10:
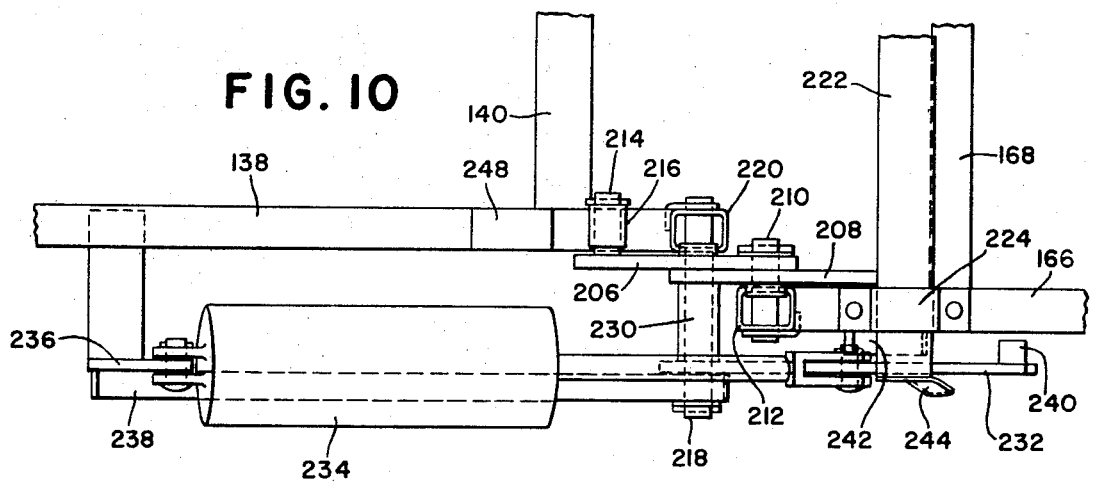
Figure 11:
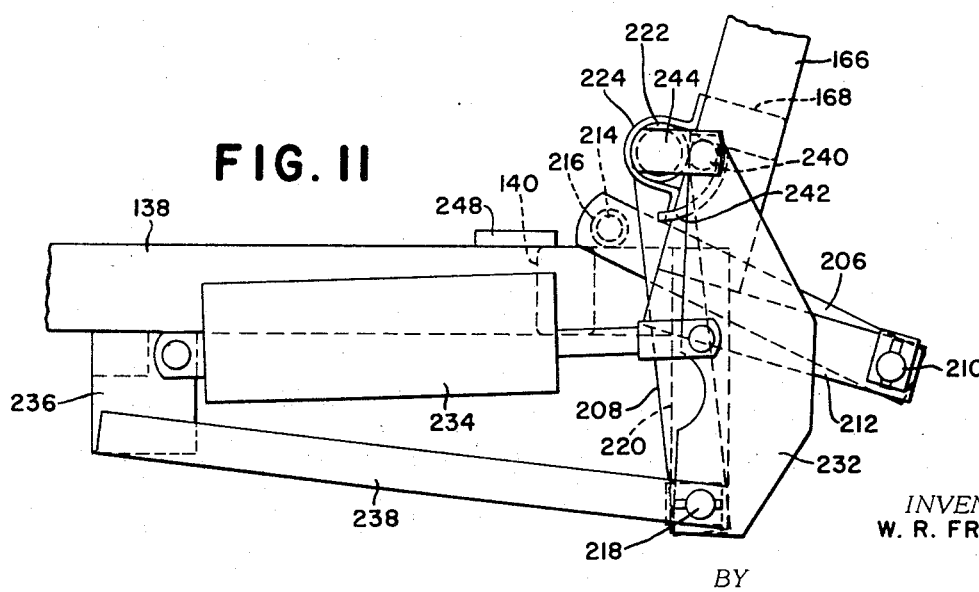

Reference is now made to FIGS. 9–11 of the drawings which illustrate the rear pivot mechanism 172 of the second embodiment in detail. Since the front pivot mechanism 170 is substantially a mirror image of the rear mechanism 172, the ensuing description will be analogously applicable to the mechanism 170 and a separate description of the latter will thus not be given. The pivot mechanism 172 consists, basically, of a pair of crossed links 206 and 208 which interconnect the subframes 134 and 136, the point of intersection of the links defining the longitudinal pivot axis of the subframes. The point of intersection, and thus the longitudinal pivot axis, is relatively low when the subframes are in their operating position, but rises as the subframes are swung to their transport position.

The lower end of the link 206 is pivotally mounted on a pin 210 received in the lower end of a vertical post 212 fixed to and extending downwardly from the frame member 160 of the right subframe 134. The upper end of the link 206 is pivotally mounted on a pin 214 received by a sleeve 216 fixed to the top side of the frame member 138 of the left subframe 136. In a somewhat similar manner, the link 208 is pivotally mounted at its lower end on a pin 218 received in the lower end of a vertical post 220 extending downwardly from the inner end of the frame member 138, and is fixed at its upper end to a longitudinal tube 222 rotatably mounted at its front and rear ends in U-shaped bearing members 224 and 226 on the fore and aft legs of the frame member 166. A link member 228 forming part of the front pivot mechanism 170 is fixed to the forward end of the tube 222 and extends downwardly therefrom in parallel relation to the link 208, the tube 222 serving to maintain this parallelism as the subframes are moved between their operating and transport positions.

The pivot pin 218 extends rearwardly from the link 208 and has a sleeve 230 rotatably mounted thereon, the sleeve, in turn, having a radially extending lift arm 232 fixed thereto. A hydraulic ram 234 interconnects the arm 232 with a bracket 236 on the frame member 138 and is extensible and retractable when connected to a conventional hydraulic fluid control system on the towing tractor to swing the arm 232 about the pin 218. A transverse support 238 interconnects the cylinder bracket 236 with the end of the pivot pin 218.

Fixed to the outer free end of the lift arm 232 is a forwardly extending abutment member 240 engageable, as the ram 234 is retracted to swing the arm upwardly, with the rear end portion of the tube 222 to thereby transfer the force of the ram to the subframe 134. As the ram is retracted further, the subframe 134 is swung upwardly from its operating position as shown in FIG. 11 until it eventually assumes its inverted transport position shown in phantom in FIG. 9. At an intermediate point in this movement of the subframe 134, the center of gravity thereof passes from the right side of the longitudinal pivot axis to the left side thereof, causing the subframe to tend to fall away from the arm 232 and abutment member 240. To prevent the subframe from falling in this manner, an arcuate stop member 242 is fixed to the rear side of the frame member 166 in concentric relation with the tube 222. Since the geometry of the pivot mechanism 172 causes the subframe 134 to pivot about the axis of the tube 222 relative to the link 208 and arm 232 as it is swung upwardly, the arcuate member 242, because it is fixed to the frame member 166, also pivots about the tube 222 as the subframe is swung upwardly and confines the abutment member 240 in an arcuate passage defined by the wall of the tube 222 and the member 242. A radially extending strap 244 on the rear end of the tube 222, which acts also as a guide for the arm 232 as it initially approaches the tube, serves to prevent the abutment member 240 from moving rearwardly out of the arcuate passage. As the subframe 134 approaches its transport position, the abutment member 240 on the lift arm 232 bears against the arcuate member 242 to prevent the subframe 134 from falling away from the lift arm. Likewise, the abutment member 240 bears against the arcuate member 242 as the subframe 134 is initially moved upwardly from its transport back to its operating position, though during the latter portion of this movement the center of gravity again crosses the pivot axis of the subframes and the abutment member 240 again bears against the tube 222 to prevent the subframe from falling away from the lift arm. When in its transport position, the subframe 134 rests on fore and aft inverted U-shaped supports 246 and fore and aft plates 248.

When the implement is in its operating position, the arcuate stop member 242 no longer confines the abutment member 240 and the arm 232 is thus free to continue its movement about the pin 218, to the position shown in solid lines in FIG. 9. When the arm is in the latter position, the subframes 134 and 136 are free to pivot relative to each other through a substantial angle to conform to variations in the ground surface. It will be apparent that this free relative pivotal movement, made possible by the addition of the lift arm 232 and arcuate member 242 to the pivot mechanism, is accomplished without the necessity of a special hydraulic "-float" valve of the type required for use with the pivot mechanism 58 of the first described embodiment. It will further be apparent that the mechanical float system just described could readily be adapted to the pivot mechanism 58 to eliminate the requirement for such a special valve in that embodiment.

I claim:

1. An implement including a pair of mobile frame means normally disposed in a side-by-side operating position, and means connecting said frame means for relative pivotal movement when in their operating position, and for relative pivotal movement between said operating position and a transport position wherein one of said frame means is inverted relative to its operating position and disposed above the other of said frame means, said connecting means comprising: a first pivot means on one of said frame means; a second pivot means on the other of said frame means; rigid link means interconnecting said first and second pivot means; lift arm means swingable about said first pivot means and engageable with said link means to swing said link means about said first pivot means and thereby move said other frame means from its operating toward its transport position, said lift arm being freely movable toward and away from said link means when the frame means are in their operating position; abutment means on said lift arm; means for pivotally moving said other frame means about said second pivot means relative to said lift arm means as said other frame means is moved from its operating toward its transport position; and stop means on said other frame means movable therewith relative to said lift arm means as said other frame means is moved from its operating toward its transport position, said stop means being movable to a position wherein it is engageable by said abutment means to limit free movement of said lift arm means away from said link means.

2. The invention defined in claim 1 wherein said stop means has an arcuate surface engageable by said abutment means, said surface being formed about the axis of said second pivot means.

3. An implement including a pair of frames normally disposed in a side-by-side operating position; and means connecting said frames for relative pivotal movement when in their operating position and for relative pivotal movement between their operating position and a transport position wherein one of the frames is inverted relative to its operating position and disposed above the other frame, said means comprising: first longitudinal pivot means on one of the frames; second longitudinal pivot means on the other frame; a rigid link interconnecting the first and second pivot means; third longitudinal pivot means on said other frame above the second pivot means; elongated structure having opposite ends and an axis of elongation; means rigidly connecting one end of the structure to said one frame; and means connecting the other end of the structure to the other frame for pivotal movement about the axis of the third pivot means and for sliding movement along a path coincident with said axis of elongation, said path intersecting said axis of the third pivot means, the distance between the axes of said first and second pivot means being greater than that between the axes of said second and third pivot means.

4. The invention defined in claim 3 wherein said elongated structure comprises a channel member having spaced leg portions, and wherein said means connecting the other end of the structure to the other frame comprises a roller supported on the other frame for rotation about the axis of the third pivot means and received between and engageable with the leg portions of said channel member.

5. The invention defined in claim 3 wherein one of said first and second pivot means comprises a longitudinally extending, rotatably supported tube, and including at least two parallel rigid link members fixed to said tube at longitudinally spaced points thereon, said link members being pivotally connected to the other of said first and second pivot means.

6. The invention defined in claim 5 including an extensible and retractable hydraulic ram interconnecting at least one of said link members with one of said frames and operative to move said frames between their operating and transport positions.

7. An implement including a pair of frames normally disposed in a side-by-side operating position, and means connecting said frames for relative pivotal movement when in their operating position and for relative pivotal movement between their operating position and a transport position wherein one of the frames is inverted relative to its operating position and disposed above the other frame, said means comprising: first longitudinal pivot means on one of the frames; second longitudinal pivot means on the other frame above said first pivot means; first rigid link means interconnecting the first and second pivot means; third longitudinal pivot means on said other frame below the second pivot means; fourth longitudinal pivot means on said one frame above the first and third pivot means; and second rigid link means interconnecting the third and fourth pivot means, the distance between the axes of the second and fourth pivot means being greater than that between the axes of the first and third pivot means when the frames are disposed in their side-by-side operating position; a lift arm swingable about the first pivot means and engageable with the first link to swing said link about the first pivot means and thereby move said other frame from its operating position toward its transport position, said lift arm being freely movable toward and away from the first link when the frames are in their operating position; abutment means on the lift arm; and stop means on said other frame movable therewith relative to the lift arm as the other frame is moved toward its transport position, said stop means being movable with said other frame to a position relative to the abutment means wherein it is engageable with the abutment means to limit movement of the lift arm away from the first link.

8. The invention defined in claim 7 wherein at least one of said longitudinal pivot means comprises a longitudinally extending, rotatably supported tube, and wherein one of said link means comprises at least two parallel link members fixed to said tube at longitudinally spaced points thereon.

9. The invention defined in claim 8 including an extensible and retractable hydraulic ram operable between at least one of said link members and one of said frames to move said frames between their operating and transport positions.

10. The invention defined in claim 7 wherein the stop means has an arcuate surface engageable with the abutment means, said arcuate surface being formed about the axis of the second pivot means.

11. The invention defined in claim 7 including an extensible and retractable hydraulic ram interconnecting said one frame and said lift arm for swinging the arm about the first pivot means.

* * * * *